Figure 7:
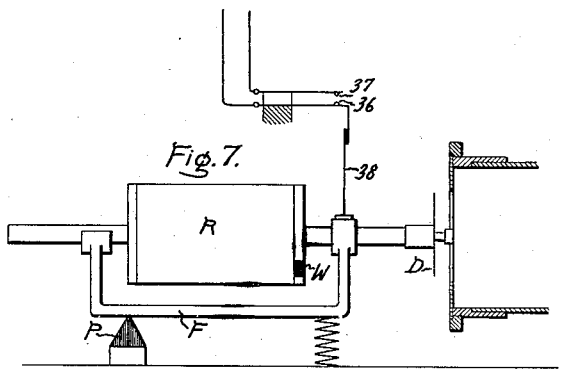

June 9, 1936.  E. L. THEARLE  2,043,845
DYNAMIC BALANCING MACHINE
Original Filed Sept. 23, 1932   3 Sheets-Sheet 1
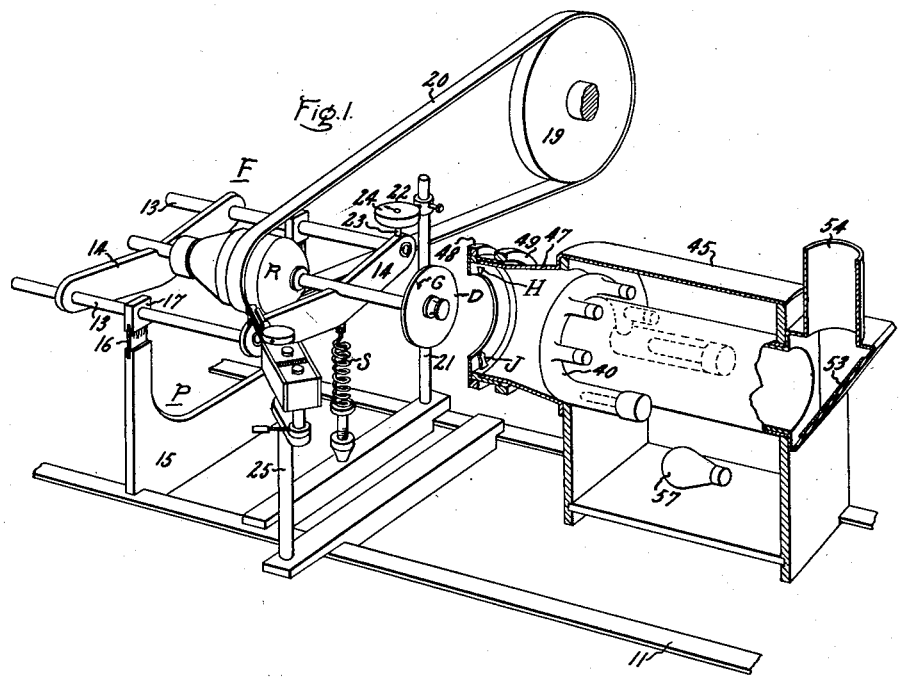
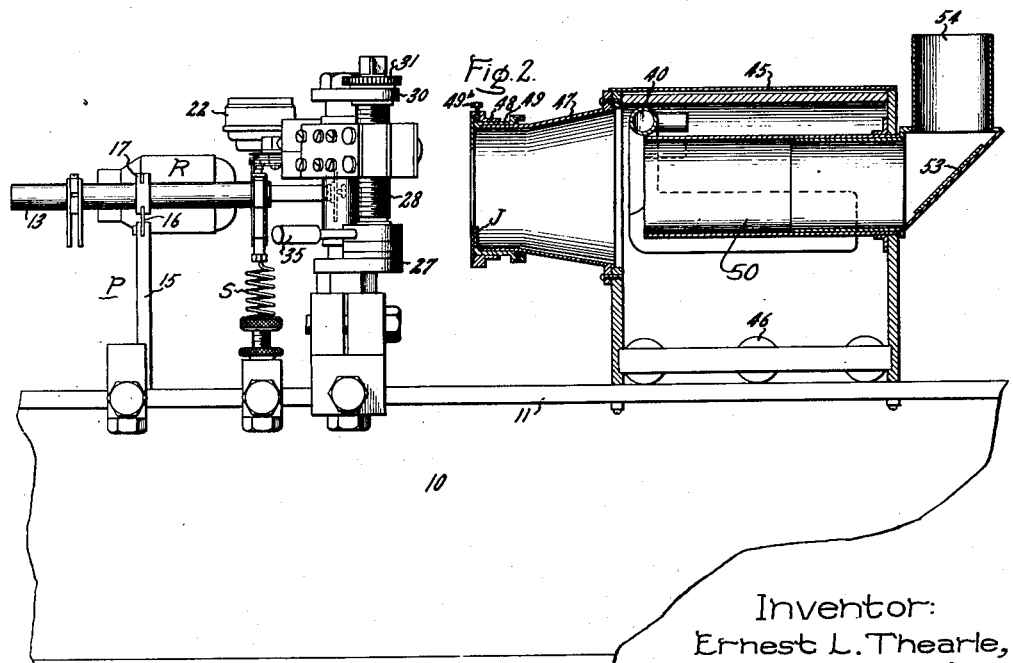
Inventor:
Ernest L. Thearle,
by Harry E. Dunham
His Attorney.

June 9, 1936.　　　　E. L. THEARLE　　　　2,043,845
DYNAMIC BALANCING MACHINE
Original Filed Sept. 23, 1932　　3 Sheets—Sheet 2
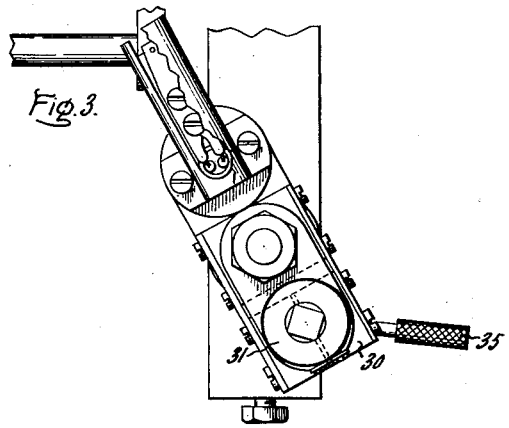
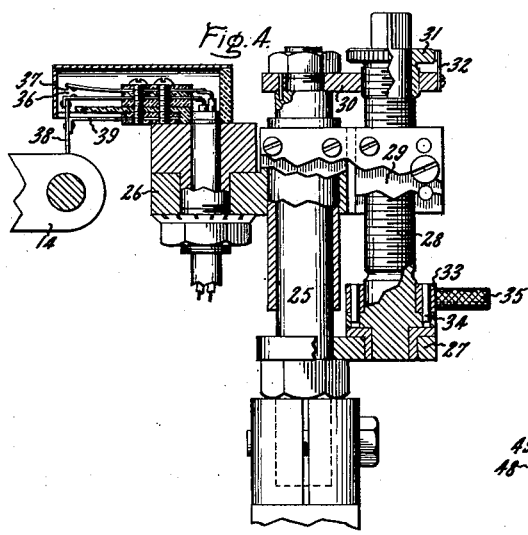
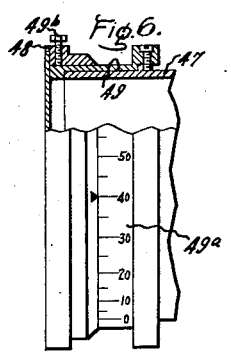
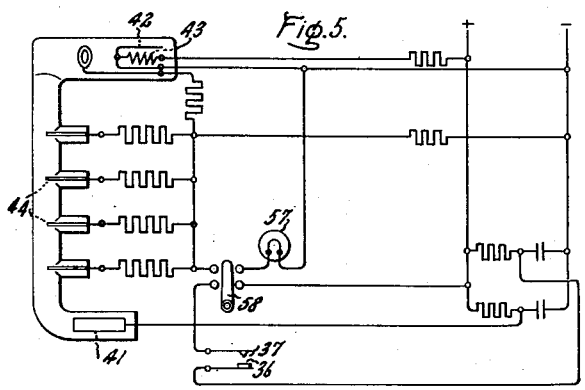
Inventor:
Ernest L. Thearle,
by Harry E. Dunham
His Attorney.

Patented June 9, 1936

2,043,845

UNITED STATES PATENT OFFICE 2,043,845

DYNAMIC BALANCING MACHINE

Ernest L. Thearle, Schenectady, N. Y., assignor to General Electric Company, a corporation of New York Original application September 23, 1932, Serial No. 634,548. Divided and this application August 19, 1933, Serial No. 685,956

11 Claims. (Cl. 73—51)

The present application is a division of my prior application, Serial No. 634,548, filed September 23, 1932, which has since resulted in Patent 1,976,588 issued October 9, 1934.

In the manufacture of bodies designed to rotate at high speeds, as for example the rotors of electric motors, it is important that they be balanced dynamically so as to prevent vibration not only of the motor but of the apparatus driven thereby. It is particularly important to balance the rotors of small motors used in household appliances where the noise incident to vibrations caused by lack of balance is especially objectionable. Such motors in order to be sold on a competitive price basis must be relatively low in cost, and therefore the cost of properly balancing the rotors becomes an important item. Moreover due to their shape and construction, it is usually a difficult matter either to add or remove weight from a rotor to obtain the proper balance.

The object of my invention is the provision of a simple dynamic balancing machine whereby the lack of balance of a rotating body, the amount of weight required to be added to effect the balance, and the position where the weight is to be added may be quickly and accurately determined.

For a consideration of what I believe to be novel and my invention, attention is directed to the accompanying description and the claims appended thereto.

In the drawings which are illustrative of my invention, Fig. 1 is a perspective view of a balancing machine of the stroboscopic type with certain of the parts broken away; Fig. 2 is a view partly in front elevation and partly in section of the machine shown in Fig. 1; Fig. 3 is a plan view of the contact mechanism for causing periodic flashing of a source of light; Fig. 4 is a sectional view of said mechanism; Fig. 5 is a diagram of circuit connections; Fig. 6 is a detail view, partly in section, of the means for manually moving a pair of the pointers; and Figs. 7 to 10 inclusive are diagrams illustrating the balancing operation.

10 indicates foundation rails or supports having out-turned flanges 11 to which certain of the parts are clamped and which also form tracks for other movable parts. The body to be balanced, in this case a small armature R for a high-speed motor, is mounted on a cradle F comprising side bars 13 and end members 14, the latter having half bearings to receive the shaft of the armature. The cradle is pivotally supported in such a manner as to have one degree of freedom and that in a vertical plane. The pivot P for the cradle comprises a frame member 15 securely fastened to the base or support. The member has two upwardly extending arms each supporting a thin flexible piece of metal 16 which permit of vertical oscillatory movements of the cradle and prevent sidewise movements thereof. The upper ends of the parts 16 are secured in blocks 17 fastened to the side bars of the cradle. The parts 16 and blocks are located in the same transverse plane which is also a plane of correction. The right-hand end of the cradle is supported by an adjustable compression spring S of such character as to support the weight of the parts and also permit the cradle to vibrate due to the presence of an unbalanced mass in the body or armature R. The armature is rotated above its resonant speed and that of the cradle system by a pulley 19 driven by a source of power, such as an electric motor. Motion from the pulley to the armature is transmitted by an endless belt 20. Because the armature is mounted in half bearings, it can be lifted and moved endwise to remove it without changing the position of driving pulley or opening the belt, all of which serves to save time in the balancing operation.

In the rear is a vertical fixed post 21 on the upper end of which is adjustably mounted a vibration indicator 22 having a depending pin 23 arranged to contact with the vibrating cradle and a pointer 24 moved by the pin over a suitable scale to indicate the amplitude of the cradle vibrations.

In order that the vibrations of the cradle may cause flashing of a source of light, a contact device is provided comprising a post 25 carried by and longitudinally adjustable on the base of the machine. On the post and guided in its vertical movements thereby is a support 26. To the post is secured a bottom plate 27 in which is seated the lower end of an adjusting screw 28, the latter extending through a nut 29 secured to the support 26. The top of the post 25 also supports an upper plate 30 which is parallel to the plate 27 and supports the upper end of the screw 28. To prevent longitudinal movements or lost motion of the screw 28, a nut 31 is carried by the upper plate and engages a shoulder on the screw formed by reducing the cross section thereof just above the screw threads. The nut 31 is held against accidental turning by the spring pressed lock 32.

Because it is necessary to adjust the contact device vertically with respect to the cradle in order that its vibrations may be caused properly to actuate the contact, means are provided for turning the adjusting screw 28, said means comprising a collar 33 which is seated on a shoulder formed on the lower end of the screw and having depending pins 34 which enter corresponding holes in said shoulder, and an actuating handle 35. Because the handle can only have a limited angular movement by reason of the presence of the post 25, it is necessary to provide means whereby a greater turning movement of the screw may be obtained. This result is obtained by having a considerable number of pin-receiving holes in the shoulder on the screw. If the maximum movement of the handle is insufficient to obtain the necessary movement of the screw, the handle is turned to some position, then lifted and the pins 34 inserted in another set or pair of holes angularly displaced from the first, after which the handle is again moved. In this manner, a wide range of adjustment is obtained in a very simple way.

Mounted on the support 26 in a manner to move up and down with it is a contact device, best shown in Fig. 4, comprising a pair of contacts 36 and 37, each carried by a light flat spring, said contacts being normally separated. To the spring carrying contact 36 is attached a depending member 38 which is acted upon by the cross member 14 of the cradle directly underneath it. The member 38 is in part supported by the thin flat spring 39, the spring carrying contact 36 and spring 39 forming a parallel motion support for the member.

Referring to Figs. 1 and 2, 40 indicates a source of light which is flashed each time the contacts 36 and 37 engage. For this purpose, a low-voltage neon lamp is used; one operating at 250 volts is satisfactory. It is of generally circular form and has a suitably arranged anode 41, Fig. 5, a cathode 42, a heater 43 and probes 44. Current is supplied from any suitable source of power and interposed in the circuits are the usual condensers and resistances. The lamp is mounted in a closed casing 45 and the latter is supported by wheels 46 which roll on the tracks 11, the wires carrying current to the lamp being in the form of cable to permit of such movements. This arrangement permits the casing to be moved to the right to facilitate the removal of a rotor R after it has been balanced and the substitution of another. On the left-hand end of the casing is a tubular extension 47 and mounted on the latter for circular movements is a pair of rings 48 and 49. The former carries a pointer or indicator H, Fig. 1, and the latter a longer pointer J, the two pointers being angularly adjustable with respect to each other so that the angle $\phi$ between them may be set or adjusted at will. The setting of this angle is a part of the calibration of the machine and need not be changed except occasionally when the machine is readjusted to accommodate a different type or size of rotor. On the ring 49 is a suitable scale 49$^a$, Fig. 6, by means of which the angular relation of the pointers with respect to each may be ascertained for future reference. The rings are normally locked in their relative angular position by screws 49$^b$.

Inside of the casing and in axial alignment with the armature being balanced is a tube 50, the free end of which projects partly through the central part of the neon lamp. The other end of the tube is secured to a wall of the casing. Located in an extension of the casing is a mirror 53, and attached to the extension is a sight tube 54 by means of which the respective positions of the indicators or pointers may be observed.

On the end of the armature shaft is mounted a small light weight disk D having a pointer G thereon. If the shaft is large enough in diameter to receive a suitable indicator or pointer, the disk may be omitted. In order to be able to observe the respective positions of the pointers or indicators G, H, and J after the circuit of the neon lamp is interrupted, an ordinary incandescent lamp 57 is located inside of the casing as shown in Fig. 1. It is controlled by the switch 58 as shown in Fig. 5 as is also the neon lamp.

Figs. 7 to 10 illustrate diagrammetrically the operation of balancing a rotor in accordance with my invention. The right-hand end of the rotor is assumed to be out of balance by an amount represented by a weight W. As previously stated, the purpose of the machine is to locate the amount and position of a weight to correct for the unbalanced weight W.

Figure 8:
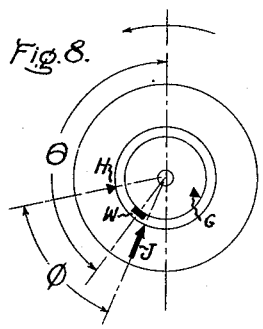

The rotor or body R having been mounted in the cradle is rotated by the belt 20, Fig. 1, at a definite constant speed which is preferably greater than the resonant speed of the rotor in its cradle system. The unbalanced weight W exerts on the rotor a centrifugal force, the vertical component of which is a periodic force. This force causes oscillations or vibrations of the cradle, about the pivot P, in a vertical plane. The vibrations of the cradle lag behind the weight producing the vibration by a definite angle $\theta$ which is independent of the amount of the unbalance weight. Thus at the instant the said weight is at the top of the rotor, the cradle has not yet reached the uppermost position in its oscillation. Or, to state the matter another way, when the cradle reaches its uppermost position in its oscillation, the said weight has moved past the top position by a certain fixed angle $\theta$ as shown in Fig. 8.

Figure 9:
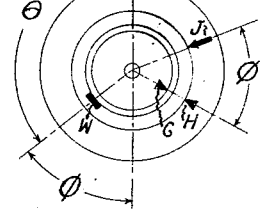
Figure 10:
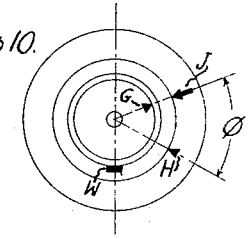

After the rotor R is brought up to balancing speed, the part 38 is gradually lowered by the adjusting screw 28, Fig. 4, until the neon or other lamp flashes which is at the instant the cradle F is at its uppermost position. The lamp, flashing once per revolution of the rotor, then illuminates the disk D and its pointer G at which time the pointer G appears to be stationary in some such position as indicated in Fig. 8. This illusion is due to the persistence of vision and is the well-known principle of a stroboscope. Since at the instant of illumination, the cradle is at the top of its movement, the unbalanced weight has moved beyond its top position by the angle of lag $\theta$ as shown in Fig. 8. While the image is being viewed, the rings 48 and 49 carrying the pointers H and J are turned by hand as a unit until pointer H coincides with the image of pointer G, as shown in Fig. 9. If the rotor be stopped in the position in which it appeared when rotating, the unbalanced weight W will be in the position shown in Fig. 9 at an angle $\theta$, the angle of lag, down from its top position. If the rotor is now turned through an angle $\phi$ equal to 180° minus $\theta$ which is also a fixed angle independent of the amount of unbalance, or until pointers G and J coincide, as in Fig. 10, then the unbalanced weight will be at the bottom of the rotor. The pointers H and J are adjusted in setting up the machine so that the angle between them is equal to $\phi$. This setting is found by trial. Therefore, if the rotor is brought to rest with the pointers G and J coincident or turned to that position, the unbalanced weight will always be at the bottom of the rotor, and the point at which the corrective weight should be added will be at the top. The amount of weight which should be added at the above located point is proportional to the width of the blur of the needle 24 of the test indicator 22 which is actuated by the cradle F. This instrument thus measures the amplitude of vibration of the cradle. For each different design of rotor to be balanced, the constant for this proportionality is determined by trial. After one end of the armature R is balanced, it is reversed in position and the other end balanced according to the method above outlined.

By setting the angle $\phi$ between pointers H and J at a different value, the machine may be used to locate the heavy point of a rotor in case the balance is to be accomplished by removing material from the rotor.

What I claim as new and desire to secure by Letters Patent of the United States, is:

1. A balancing machine comprising an elastically supported cradle in which the body to be balanced is located, means for rotating the body at balancing speed, a pointer rotating in synchronism with the body, an indicator actuated by the cradle for indicating the amplitude of its vibrations due to lack of balance of the body, electrical contacts actuated by the cradle as it vibrates, a support movable toward and away from the body and pointer, a lamp carried by the movable support, the circuit of which is periodically made by the contacts at the maximum deviation of the cradle in one direction, and a pair of pointers mounted on the support and manually and independently adjustable, one of said pairs of pointers at the instant the light flashes serving to determine the angular position where the weight is to be applied to the body when the other is in register with the apparent image of the first-named pointer.

2. A balancing machine comprising an elastically supported cradle in which the body to be balanced is located, means for rotating the body at balancing speed, an instrument actuated by the cradle for indicating the amplitude of its vibrations due to lack of balance of the body, electrical contacts actuated by the cradle at the maximum deviation thereof in one direction as it vibrates, a support mounted to move toward and away from the cradle, a lamp carried by and movable with the support, the circuit of the lamp being periodically made and broken by the contacts, a pointer revolved by the body, a pair of angularly adjustable pointers carried by the support, one of said pair being indicative of the position of the unbalanced mass in the rotating body when the other is in register with the apparent image of the pointer revolving with the body, and a sight tube carried by the support through which the positions of all of the pointers may be observed when the body is rotating.

3. A balancing machine comprising an elastically supported cradle in which the body to be balanced is located, said cradle vibrating due to unbalance in the body, means for rotating the body at balancing speed, a base for supporting the cradle, contacts actuated by the cradle at the maximum deviation thereof in one direction for making and breaking an electrical circuit, a member secured to the base, a support for the contacts mounted on and guided by the member, said support having a threaded opening, an adjusting screw extending into the opening, and a means for turning the screw to raise and lower the support on the member to move the contacts into operable relation with respect to the vibrating cradle.

4. A balancing machine comprising an elastically supported cradle in which the body to be balanced is located, said cradle vibrating due to unbalance in the body, means for rotating the body at balancing speed, a base for supporting the cradle, contacts actuated by the cradle at the maximum deviation thereof in one direction for making and breaking an electrical circuit, a member secured to the base, a support for the contacts mounted on and guided by the member, said support having a threaded opening, an adjusting screw extending parallel to the member and having a perforated means seated at one end thereof, a means carried by the member for supporting the upper end of the screw and holding it against axial movement, a ring through which the screw freely extends, said ring having pins adapted to successively enter the perforations, and a means for turning the ring and screw to adjust the position of the contacts with respect to the cradle.

5. A balancing machine comprising an elastically supported cradle arranged to receive the body to be balanced, a stationary instrument actuated by the cradle to indicate the amplitude of its vibration, means for rotating the body in the cradle, a pointer, means for rotating the pointer in synchronism with the body, a source of light, a means actuated by the cradle at the instant of its maximum displacement during vibration in one direction to cause periodic flashing of the light, a support in axial alignment with the body and pointer, and a pair of pointers in spaced angular relation adjustably mounted on the support in a plane perpendicular to its axis, said pointers being so arranged that when one of them at the instant the light flashes is aligned with the apparent image of the rotating pointer, the other when adjusted to coincide in position with said pointer when it is at rest determines the position on the body where the counter balance correction is to be made.

6. A balancing machine comprising a support capable of vibrating with one degree of freedom and arranged to receive the body to be balanced, means for rotating the body in the support at balancing speed, a pointer, means for rotating the pointer in synchronism with the body, a source of light, a means actuated by the support as it vibrates for causing periodic flashing of the light at the instant of maximum displacement during vibration, a second support independent of and in axial alignment with said body and movable toward and away from the body and pointer, a pair of pointers mounted on the second support in predetermined spaced angular relation and movable circumferentially thereon as a unit to different angular positions, one of said pointers when adjusted to align with the apparent image of the first named pointer as it rotates, indicating the angle of lag of the body support with respect to the unbalanced mass in the body, and the other when aligned with the first named pointer when it is at rest affording an indication of the location of the unbalanced mass in the body.

7. A balancing machine comprising a cradle arranged to receive the body to be balanced, a pivotal support for one end of the cradle, a spring support for the other end, said support and spring permitting the cradle to vibrate in a vertical plane, due to lack of balance in the body, an instrument actuated by the cradle as it vibrates to indicate the amplitude of its vibration, means for rotating the rotor at balancing speed, a pointer, means for rotating the pointer at the same speed as the body, a support which is movable toward and away from the body and pointer and has a tubular portion, the axis of which is aligned with that of the body being balanced, an electric lamp carried by and movable with the support, a contact device causing periodic flashing of the lamp at the instant of maximum displacement during vibration of the cradle, means for adjusting the position of the contact device with respect to the cradle, and a pair of pointers adjustably mounted on said tubular portion for angular movement thereon, one of said pointers serving to indicate the angle of lag of the first named support with respect to the unbalanced mass in the body, and the other serving to indicate the location of said mass in the body.

8. A balancing machine comprising a support for the body to be balanced and vibrated thereby, means for rotating the body at balancing speed, a pointer supported by the shaft of the body and rotated in synchronism therewith, a second support movable at will toward and away from the pointer, guides for holding the support in axial alignment with the rotating body, a tubular extension on the second support, a pair of pointers mounted on the extension and angularly adjustable thereon to afford certain indications, a sight tube means permitting observation of the rotating pointer, a lamp, and a circuit controller for the lamp which is actuated by the support at the instant of its maximum vibration to cause the lamp to illuminate said first named pointer.

9. A balancing machine comprising a support capable of vibrating and arranged to receive the body to be balanced, means for rotating the body at balancing speed, a pointer, means for rotating the pointer in synchronism with the body, circuit controlling contacts actuated by the support as it vibrates, a post, a support for the contacts mounted on the post, a screw for adjusting the support on the post, an electric lamp circuit controlled by the contacts, and a means mounted on the post for taking up lost motion between the screw and contact support, the said support closing the contacts to cause the lamp to illuminate the pointer once during each revolution of the body and at the instant of maximum deflection of the support.

10. A balancing machine comprising a support capable of vibrating and arranged to receive the body to be balanced, means for rotating the body at balancing speed, a pointer, means for rotating the pointer in synchronism with the body, circuit controlling contacts actuated by the support as it vibrates, a post, a support for the contacts mounted on the post, top and bottom plates rigidly supported by the post, an adjusting screw supported at its ends by the plates to turn therein and acting to move the support for the contacts, a shoulder on the screw for turning it, said shoulder having angularly spaced holes therein, a collar for turning the screw having a pin which may be inserted in any one of the spaced holes for turning the screw, and an electric lamp circuit controlled by the contacts for illuminating the pointer once during each revolution of the body as the contacts are closed at the instant of maximum vibration of the support.

11. A balancing machine comprising a support capable of vibrating and arranged to receive the body to be balanced, means for rotating the body in the support at balancing speed, a pointer, means for rotating the pointer in synchronism with the body, a second support having a portion extending toward the pointer and in axial alignment therewith, a lamp of substantially circular form located within the second support, a circuit for supplying current to the lamp, a sight tube means having a tubular member located within the second support and extending toward the lamp, a contact device for the lamp circuit which is actuated by the first named support at the instant of its maximum vibratory movement in one direction, and a pair of pointers carried by the second support and manually adjustable thereon, one of the pointers when adjusted with respect to said rotatable pointer when it is at rest indicating the angle of lag of the first named support, and the other of said pointers when adjusted indicating the position of the unbalanced mass in the body.

ERNEST L. THEARLE.